United States Patent [19]

Katz

[11] Patent Number: 5,801,365
[45] Date of Patent: Sep. 1, 1998

[54] FUND RAISING BY DISCOUNTED COLLECTION ON SPECIAL ISSUE CHECKS

[76] Inventor: Richard B. Katz, Suite 2980, City Center Sq., Kansas City, Mo. 64105

[21] Appl. No.: 676,423

[22] Filed: Jul. 8, 1996

[51] Int. Cl.⁶ .................................................. G06F 15/30
[52] U.S. Cl. ................................................ 235/359; 283/58
[58] Field of Search .................................. 283/57, 58, 59; 235/379

[56] References Cited

U.S. PATENT DOCUMENTS

| | | | |
|---|---|---|---|
| 1,637,985 | 8/1927 | Cline | 283/59 |
| 3,950,015 | 4/1976 | Shrock | 283/57 X |
| 4,614,365 | 9/1986 | Tresser | 283/59 |
| 4,944,532 | 7/1990 | Pollard | 283/58 X |
| 5,176,224 | 1/1993 | Spector | 186/52 |
| 5,377,611 | 1/1995 | Crookham et al. | 116/173 |
| 5,566,981 | 10/1996 | Alcordo | 283/58 |

*Primary Examiner*—Donald T. Hajec
*Assistant Examiner*—Karl Frech

*Attorney, Agent, or Firm*—Litman, McMahon & Brown, L.L.C.

[57] ABSTRACT

A method of fund raising for a non-profit organization by discounted collection on special issue checks includes collecting funds from members of the organization and depositing the funds in an account in a bank, issuing special checks backed by the funds to the members, use of the checks at face value by the members to purchase goods or services from the participating merchants, clearing of the checks back to the bank on which they are drawn, and payment on the checks to the named payee merchants at the face value minus a prearranged discount. The checks are MICR encoded with a discount value prior to presentation for collection. The discount is credited to the organization minus any service fees required by the bank or clearing process and a share of the discount to an intermediary company which negotiates cooperation of the bank and acceptance of the checks at face value and discounted collection by the merchants.

21 Claims, 4 Drawing Sheets

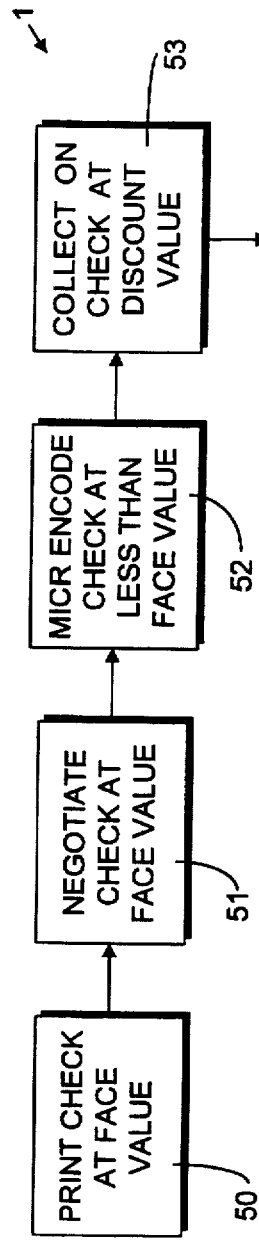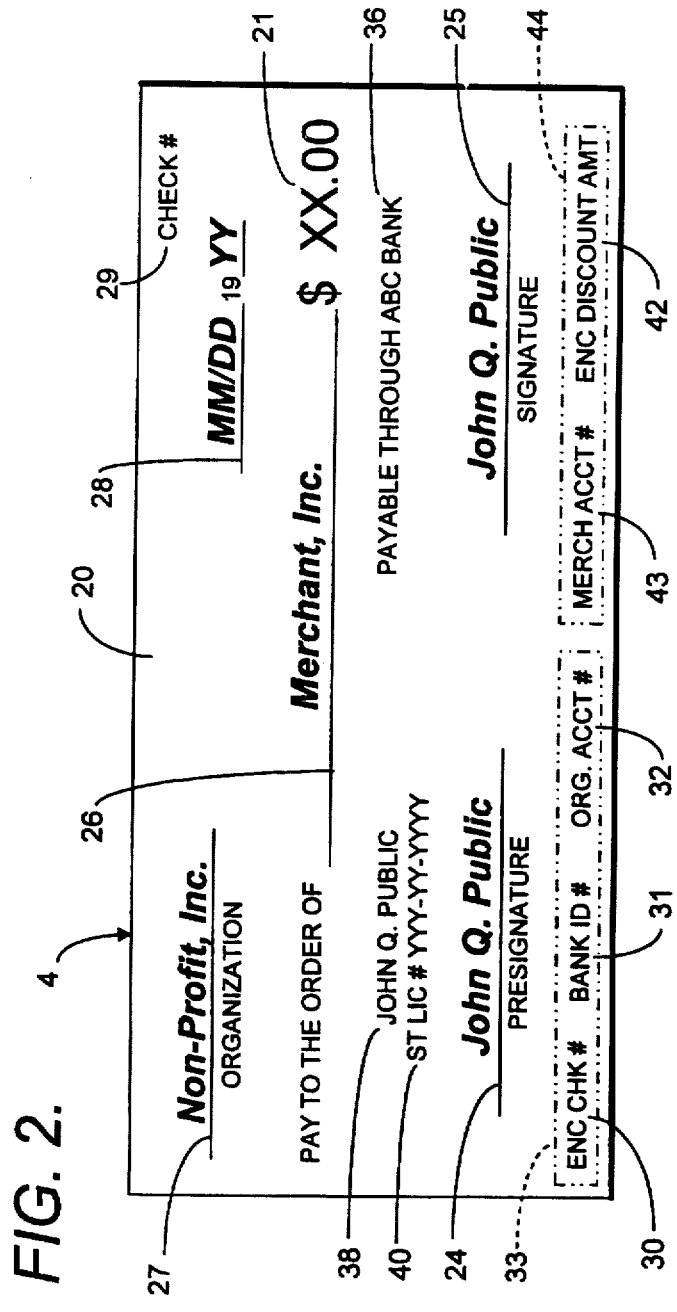

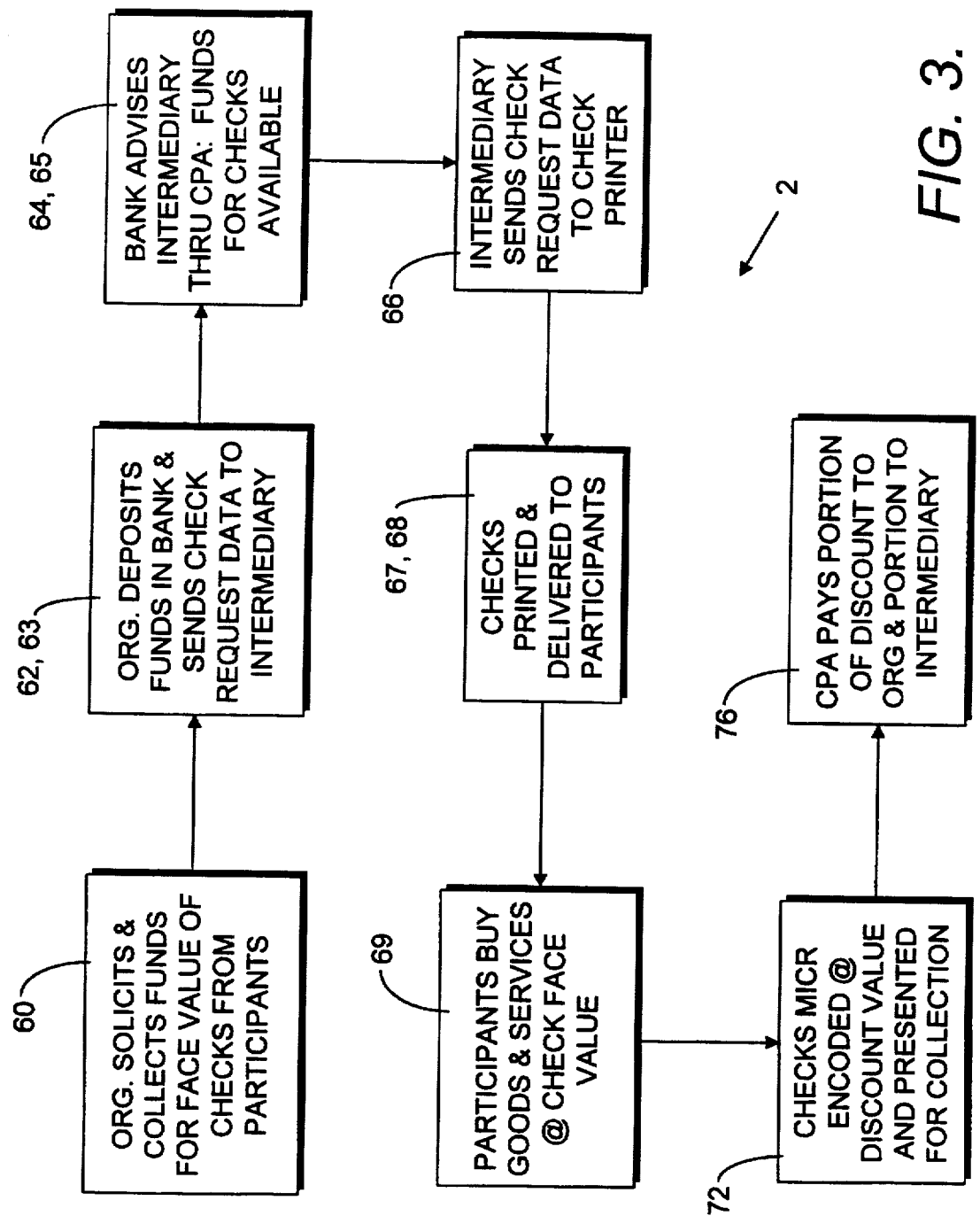

000
FUND RAISING BY DISCOUNTED COLLECTION ON SPECIAL ISSUE CHECKS

BACKGROUND OF THE INVENTION

There are many methods for raising funds by charitable and other non-profit organizations. A common method is the solicitation of direct monetary donations by members of the organization and by non-members who support the goals and programs of such organizations. Another common approach is the solicitation of goods and services from retail merchants and vendors which are then sold, raffled, or given away as door prizes at social events and functions of the organizations, at which nominal donations are requested for admission. Generally, the merchant's motive in such donations to the organization is the creation of good will for the merchant among the members of the organization, who might then be more likely to patronize the merchant. Additional motivations may include support for or membership in the organization by a person prominent in the merchant's establishment.

Many members who would otherwise be willing to make direct donations to their organization are unable to do so or are limited in the amount they can donate because of limitations in their finances or more pressing financial obligations. Similarly, merchants may be restricted from donations to organizations by their corporate policies or may perceive little benefit to their establishments in making such donations. Donations to organizations may also be impractical for some merchants, such as vendors of so-called "big ticket" items like major appliances, furniture, or the like.

SUMMARY OF THE INVENTION

The present invention provides a method of fund raising which benefits not only the intended organization, but also the members of the organization and participating merchants as well. Merchants often place certain goods or services "on sale". The margin of profit on such sale goods or services is reduced to entice purchasers into their establishments. The object is to offset the loss of profit per sale by increased volume of sales. Additional benefits include customers' purchases of items not on-sale and price breaks to the merchant for increased volumes of orders from suppliers.

In the method of the present invention, an organization, or an intermediary acting on behalf of the organization, negotiates with one or more merchants to accept specially issued checks at the face value of the check and then to accept collection on the checks at a selected discount value below the face value. The organization collects money from its members who wish to order such checks and deposits such money in an account in a bank whose cooperation has also been negotiated by the organization or the intermediary. Special checks are issued to the members who have ordered the checks through the organization. The members then make purchases from participating merchants using the special checks at face value toward their purchase. The discount difference or margin by which collection on each check is reduced is credited to the account of the organization, or is split according to a prearranged ratio between the organization and the intermediary after any expenses or service fees have been deducted.

The intermediary preferably acts as a clearing vehicle for collections on the special checks for smaller merchants having smaller volumes of sales and of the special checks, although conventional clearing through the Federal Reserve System can also be employed. The special checks of larger merchants are deposited in their corporate bank accounts and cleared back to the bank on which the special checks are drawn by way of the Federal Reserve System.

In a preferred embodiment of the fund raising method of the present invention, the organizations enters the identities of the members ordering checks along with the dollar amounts of the checks into software and provides a check request data feed to the intermediary. Upon receiving a confirmation from the organization's bank that funds are available to back the checks, by way of a certified public accountant firm, the intermediary sends a check request data feed to a check printer company which prints the checks in the requested amounts for the members who ordered the checks. The checks are then delivered to the members by the check printer, a separate company such as an armored delivery service, or by way of the organization.

Preferably, the printed check identifies the member by name as the check maker and, additionally, identifies the maker by an official identification number which can be verified by the merchants, such as the check maker's driver's license number. The check printer prints a magnetic ink character recognition (MICR) encoded bank identification number of the organization's bank and a MICR encoded organization account number on the check, along with a denomination amount which is the face value of the check. A MICR encoded check number may also be printed on the check. The check has fill-in lines for the date, the beneficiary organization, the merchant payee, a presignature line, and a signature line. As soon as the check is received by the member, the member should sign the presignature line. When the check is negotiated for goods or services from a merchant, the member signs the regular signature line. The merchant should request the customer's driver's license and compare its number and signature with that on the check and compare the presignature with the signature on the check. These provisions are made to prevent use of the check by an unauthorized person.

In conventional check collection procedures, a merchant deposits customers' checks in the merchant's bank who then MICR encodes the amount for collection as the dollar amount entered by the check maker on the check, and clears the check to the issuing bank through the Federal Reserve System. In the Federal Reserve System, the account of the bank issuing the check is debited for the MICR encoded amount of the check, and, in turn, the check issuing bank debits the account of the check maker. The Federal Reserve System also credits the merchant's bank for the MICR encoded amount of the check, and the merchant's bank credits the merchant's account.

In the present invention, either the merchant or the intermediary MICR encodes a discount amount on the check equal to the face value or denomination of the check minus the contracted discount margin. Additionally, a merchant identification number is MICR encoded on the check. The Federal Reserve System debits the issuing bank and credits the merchant's bank according the MICR encoded discount amount. The organization's bank pays the discount difference, minus its service fee, to the accountant firm which pays the services fees of the check printer, the check delivery company, and its own service fee and splits the remainder between the non-profit organization and the intermediary according to a prearranged ratio.

The bank on which the special checks are drawn benefits from the deposits held in the accounts of the organizations which participate in the fund raising method of the present invention and from the service fees it receives. The organization members benefit by financially aiding their organization without the need for actual monetary donations. The amounts of the funds the members pay for the special checks are returned to them dollar for dollar in the face values of the special checks. The members need only spend amounts they already had planned to spend and direct their purchasing to the participating merchants.

Although the merchants pay the entire cost of the fund raising method of the present invention, the merchants benefit in the same manner as if they were holding a sale, that is, increased volume of sales and traffic in their establishments. The merchants may incur additional good will with the members of the organization by their willingness to participate in a program which benefits the organization. The merchant may also receive tax benefits in the form of tax deductions for the amounts contributed by the merchant to the non-profit organization. The organization preferably receives the major portion of the amount by which collection on the special checks by the merchants is discounted.

The intermediary is a company which negotiates with the merchants to accept the special checks, the amount of which will be discounted upon collection. The intermediary negotiates the cooperation of the bank for the special processing of the checks and the services of the accountant firm for the distribution of the shares of the discount margin. The intermediary contracts for printing and delivery of the special checks and acts as a conduit for the transfer of check request data from the organization to the check printer. Finally, the intermediary facilitates discounted collection on the checks for smaller merchants by MICR encoding the discounted amounts on the special checks received by the smaller merchants. For its services, the intermediary receives a portion of the discount margin from collections on the special checks.

OBJECTS AND ADVANTAGES OF THE INVENTION

The principal objects of the present invention are: to provide an improved method for fund raising by non-profit organizations; to provide such a method which benefits the organization by efforts of its members without actual monetary donations by the members; to provide such a method in which retail merchants and banks cooperate with the organization and its members to raise funds for the organization; to provide such a method including the purchase of special checks by members of the organization by funds which are deposited in a bank account, the purchase of goods or services from participating merchants at the face values of the checks by the members, discounted collection on the checks by the merchants, and crediting of at least a portion of the amounts by which collection on the checks is discounted to the organization; to provide such a method wherein an intermediary company negotiates participation by banks and merchants and which receives a portion of the discount margin on each check for the services it provides; to provide such a method in which the intermediary company serves as a check clearing house for special checks received by small volume merchants; to provide a check form for such a fund raising method which includes a denomination amount, the identity of the check maker, and an identification number, such as the check maker's driver's license number preprinted on the check; to provide such a check form having a check number, an organization account number, and a bank identification number identifying the bank on which the check is drawn all MICR encoded on the check; to provide such a check form having fill-in lines for the payee of the check, the organization to receive benefits from use of the check, the date the check is negotiated, a presignature line to be signed by the maker upon receiving the check, and a signature line to be signed when the check is negotiated; to provide such a check which has a preagreed discount amount, relative to the face value denomination amount, MICR encoded onto the check to allow less than face value presentation for collection after negotiation of the check; to provide such a check form which complies with requirements of the Federal Reserve System for clearance therethrough; to provide such a fund raising method which complies with all applicable federal and state laws; and to provide such a fund raising method which is beneficial to all participants and which is particularly well adapted for its intended purpose.

Other objects and advantages of this invention will become apparent from the following description taken in conjunction with the accompanying drawings wherein are set forth, by way of illustration and example, certain embodiments of this invention.

The drawings constitute a part of this specification and include exemplary embodiments of the present invention and illustrate various objects and features thereof.

BRIEF DESCRIPTION OF THE DRAWINGS

FIG. 1 is a simplified block diagram illustrating the principal steps of a check handling process which forms a component of a fund raising method embodying the present invention.

FIG. 2 is a front view of an exemplary check as used in the fund raising method according to the present invention.

FIG. 3 is a block diagram illustrating the steps of the fund raising method of the present invention.

DETAILED DESCRIPTION OF THE INVENTION

Figure 4:
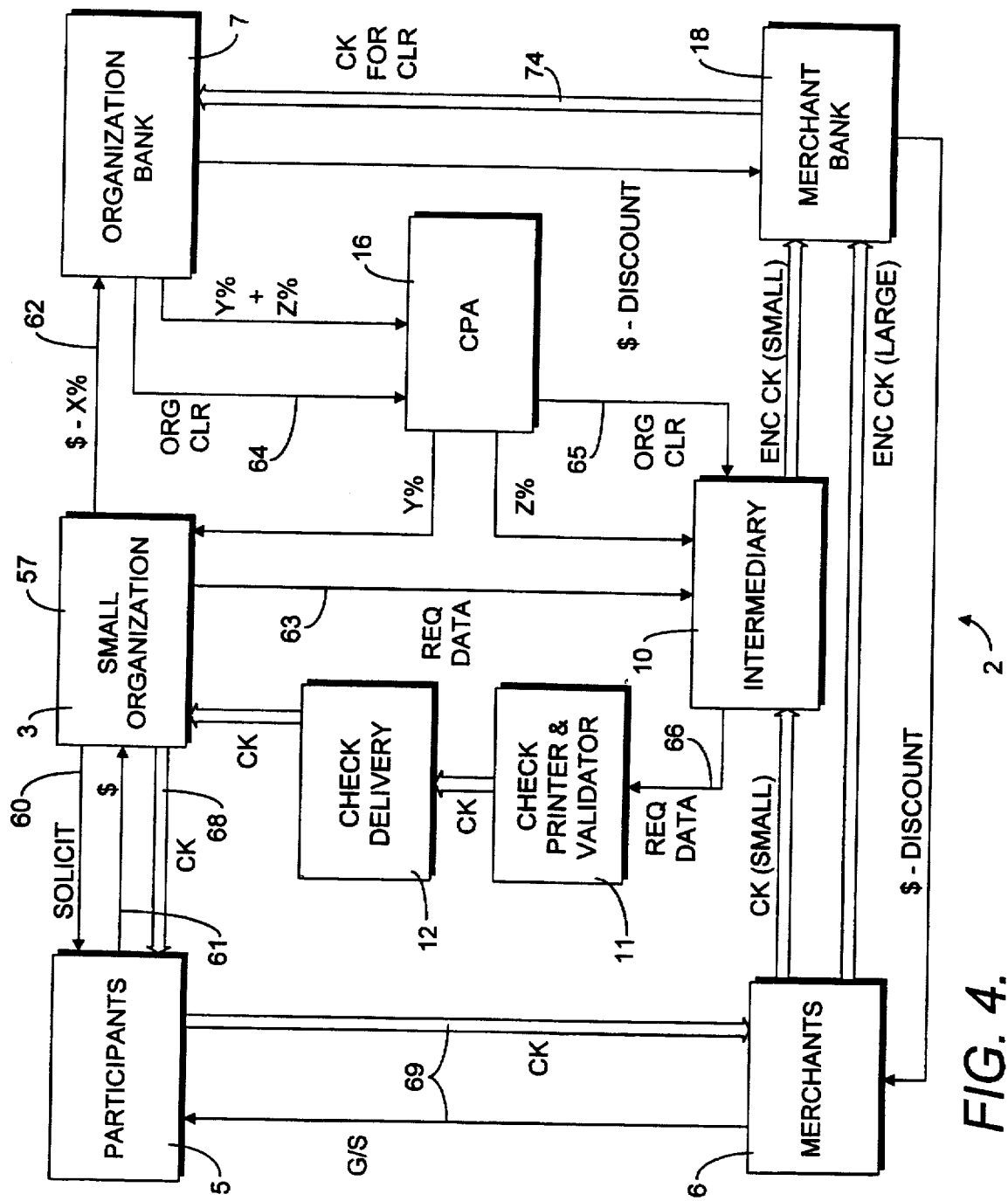
FIG. 4 is a block diagram illustrating the flow of money and checks among entities involved in the fund raising method according to the present invention to benefit a relatively small non-profit organization.

As required, detailed embodiments of the present invention are disclosed herein; however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Referring to the drawings in more detail:

The reference numeral 1 generally designates a check handling process which forms a principal component of a fund raising method 2 (FIG. 3) for a non-profit organization 3 (FIGS. 4 and 5), the fund raising method 2 embodying the present invention. The method 2 generally includes the purchase of special checks 4 (FIG. 2) by participants 5 (FIGS. 4 and 5) of the organization 3, the purchase of goods and/or services from participating merchants 6 using the checks 4 at face value, collection on the checks 4 by the merchants 6 at a discount below their face value when the checks 4 are cleared back to a bank 7 on which the checks 4 are drawn, and crediting at least a portion of the discount margin to an account of the organization 3 in the bank 7.

The non-profit organization 3 may be any one of a number of types of non-profit organizations including, but not limited to, a church, a synagogue, a school, an organization which raises funds for research and treatment of certain diseases, a civic organization, a youth recreation organization, or the like. The merchant 6 may, for example, be any type of retail or mail order vendor, a restaurant, a repair shop, a plumber, an electrician, a lawn and garden service, or the like.

The fund raising method 2 of the present invention preferably involves an intermediary company 10 (FIGS. 4 and 5) which negotiates the cooperation of the bank 7 and negotiates with the merchants 6 to accept the checks 4 at face value for goods or services and to accept collection on the checks 4 at a discounted percentage. The intermediary 10 may also print or contract for the printing of the checks 4. Finally, the intermediary 10 may function as a clearing vehicle for checks 4 received by smaller merchants 6. Preferably, the checks 4 are printed by a check printer company 11 and delivered to the participants 5 by a check delivery company 12 (FIG. 4), such as an armored delivery service, a messenger service, the mail, or the like. Alternatively, a check company 14 (FIG. 5) may print and deliver the checks 4.

The operation of the fund raising method 2 of the present invention is, in effect, overseen by a certified public account firm 16 (FIGS. 4 and 5), also referred to herein simply as the accountant or accounting firm. The accounting firm 16 assures that requirements of the state and federal laws are complied with and may maintain records of monetary amounts paid out by the merchants 6 and received by the organization 3, and service fees paid to the organization's bank 7, the check printer 11, check delivery service 12, check company 14, and the intermediary 10. The accounting firm 16 informs the intermediary 10 when funds deposited by the organization 3 are available to back the checks 4 to enable the checks 4 to be printed. Finally, the accountant 16 pays out the portions of the discount margin on each check 4 after the checks 4 have cleared from the merchant's bank 18 (FIGS. 4 and 5) to the organization's bank 7.

FIG. 2 illustrates an exemplary check 3 for use in practicing the fund raising method 2 of the present invention. The check 4 is printed on a check base 20 of paper and may be plain or may include graphics or designs (not shown) for decorative purposes. The check 4 has indicia preprinted thereon indicating a denomination or amount 21. The denomination amount 21 is the face value of the check 4 and is the monetary value at which the merchant 6 honors the check 4. The check 4 includes a presignature line 24 and a signature line 25. The presignature line 24 is to be signed by the participant 5 when the check 4 is received, while the line 25 is to be signed by the participant 5 as maker of the check 4 when the check 4 is negotiated for goods or services from the merchant 6. A payee line 26 receives the name of the merchant 6 with whom the check 4 is negotiated. The illustrated check 4 has a fill-in line at 27 to identify the organization 3 which is the beneficiary of the transaction using the check 4. Alternatively, the name of the organization 3 can be preprinted on the check base 20 (not shown). A date fill-in line 28 receives the date the check 4 is negotiated. The check 4 may also include a check number 29 preprinted on the check base 20. On the exemplary check 4 illustrated, the fill-in lines 24-28 are shown with indicia in an Italic font to represent matter handwritten in by the participant 5.

The special check 4, according to the present invention, includes a MICR (magnetic ink character recognition) encoded check number 30, a bank identification number 31 identifying the bank 7 on which the check 4 is drawn, and an organization account number 32 identifying account of the organization 3 with the organization's bank 7. MICR encoding is a standard check encoding process which is required by the Federal Reserve System for mechanical processing therethrough. The MICR encoded check number 30, bank identification number 31, and organization account number 32 form a preprinted block 33 of MICR encoded characters preprinted on the check base 20 by the check printer 11 or check company 14 prior to issuance of the check 4 to the participant 5. In addition to the bank identification number 31, the bank 7 may be identified by human readable indicia showing the name of the bank 7, as at 36.

The check 4 preferably has the name of the participant 5 who is the maker of the check 4 preprinted thereon, as at 38. Additionally, for security, an official identification number of the participant 5, such as a state driver's license number, is preprinted on the check base 20, as at 40. The merchant 6 accepting the check 4 can be assured that negotiation of the check 4 is authorized by requesting to see the driver's license of the person passing the check 4 and comparing the number on the license with that printed at 40 on the check 4 and comparing the signature on the license with the presignature 24 and signature 25 on the check 4.

As part of the check clearing process, merchants 6 dealing in a large volume of the special checks 4 MICR encode the checks 4 with a preagreed discount amount 42 and with a merchant account number 43 which identifies the particular merchant 6 who received the check 4. The MICR encoded discount amount 42 and merchant account number 43 form a clearance block 44 of MICR encoded characters. The intermediary company 10 may apply the clearance block 44 of MICR encoded characters for smaller merchants 6 who process a relatively small volume of the special checks 4. The MICR encoded discount amount 42, in particular, is used by the Federal Reserve System as the amount by which accounts are credited and debited to clear the checks 4. On a conventional check, the MICR encoded amount is equal to the face value of the check. In contrast, the MICR encoded amount 42 on the special check 4 of the method 2 is always less than the face value of the check 4, as determined by the denomination indicia 21, by the preagreed discount difference or margin.

Referring to FIG. 1, the Check handling process 1 of the fund raising method 2 is illustrated. The check 4 is printed at step 50 at the face value indicated by the denomination 21 by the check printer 11 or check company 14. The check 4 is negotiated at face value at step 51 by the participant 5 at a participating merchant 6 to purchase goods or services therefrom. The merchant 6 or the intermediary 10 MICR encodes the check 4 at step 52 with the preagreed discount amount 42. The check 4 is presented for collection, at step 53, at the discount amount 42 rather that the face value or denomination 21 by depositing in the merchant's bank 18 and clearance to the organization's bank 7 through the Federal Reserve System. Finally, a portion of the discount difference or margin is paid to the non-profit organization 3 at step 54.

Figure 5:
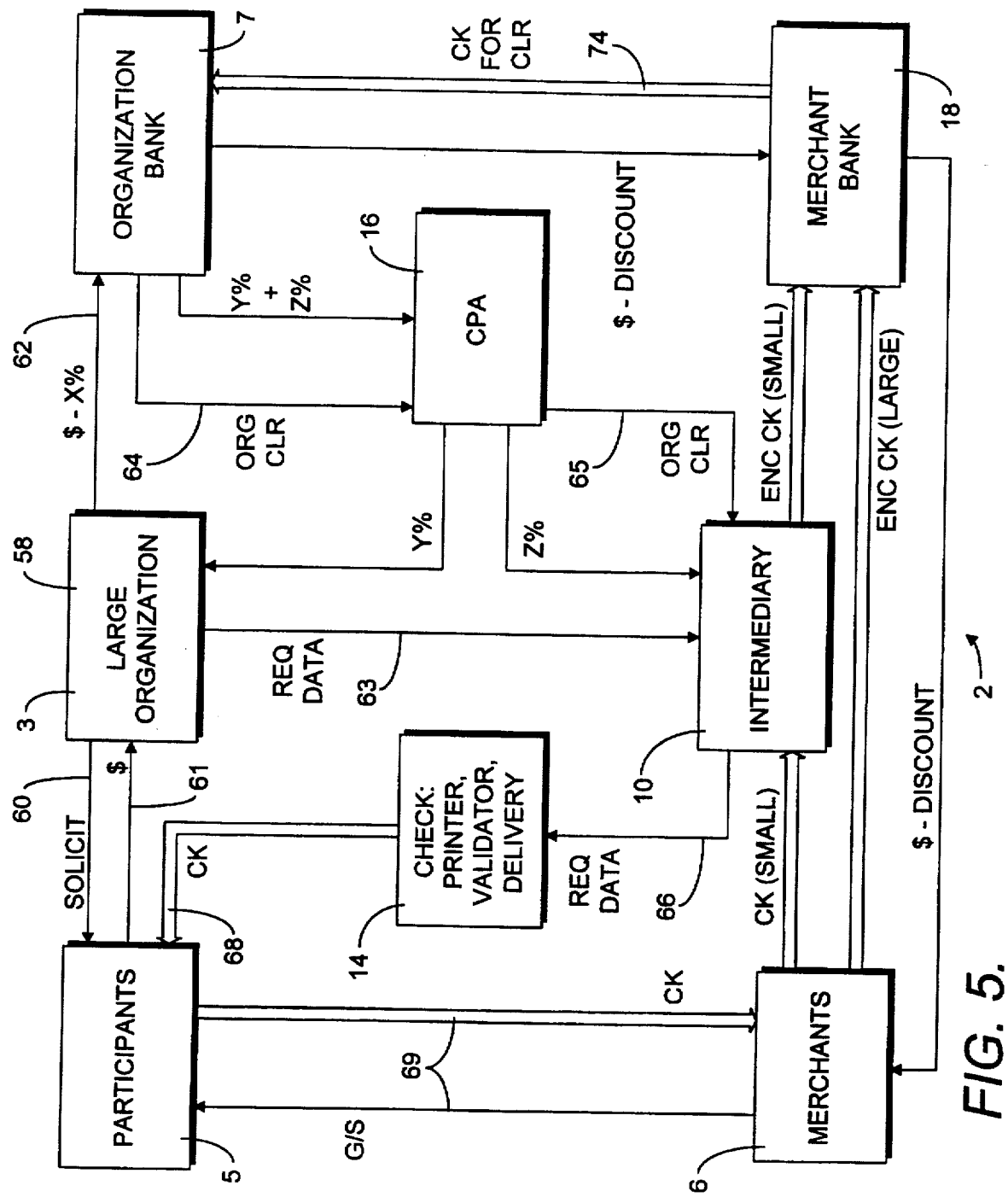
FIG. 5 is a block diagram illustrating the flow of money and checks among entities involved in the fund raising method according to the present invention to benefit a relatively large non-profit organization.

FIGS. 4 and 5 illustrate the flow of the special checks 4 and money among the various entities involved in the fund raising method 2. FIGS. 4 and 5 are similar in most respects, and corresponding entities and paths have been designated by the same reference numerals. FIG. 4 is directed to the method 2 involving a relatively small, local non-profit organization 57 which has fairly close contact with its members as participants 5, such as a church, synagogue, school, or the like. With such a small, local organization 57, it is economical and convenient for the ordered checks 4 to be sent from the check printer 11 to the organization 57 for distribution among the participants 5. FIG. 5 is directed to practice of the method 2 involving a relatively large organization 58 having a regional, national, or even international scope which generally does not have close contact with its members as participants 5. With such a large organization 58, it is more economical and convenient for the checks 4 to be sent directly from the check printing company 14 to the participants 5, as by mail, rather than incurring delays which might occur in channeling the checks 4 through the large organization 58.

Referring to FIG. 3, along with FIGS. 4 and 5, the organization 3 solicits orders for the checks 4 from the participants 5 at given face values at step 60. The participants 5 order special checks 4 in desired denominations 21 and submit monetary amounts to cover the ordered checks 4 to the organization 3 at step 61 (FIGS. 4 and 5), symbolized by the dollar sign $ in the figures. The organization 3 deposits the funds received in their bank 7 to back the ordered checks 4 at step 62, and sends check request data 63 to the intermediary 10. The $-X% symbol at 62 in FIGS. 4 and 5 indicates that the organization 3 receives an initial portion of its expected benefit from use of the checks 4 upon depositing the funds in the bank 7. The check request data is a digital data feed and provides the name 38 and identification number 40 (FIG. 2) of each participant 5 for the denomination 21 of each check 4 ordered.

At steps 64 and 65, the bank 7 advises the intermediary 10, through the accounting firm 16 (CPA) that funds are available to back the ordered checks 4 (ORG CLR, or organization clear). Upon receiving confirmation that funds are available to back the checks 4, the intermediary 10 forwards the check request data as a digital data feed to the check printer 11 or check company 14 at step 66. The checks 4 are printed in the ordered denominations 21 for the specific participants 5 at step 67 and delivered at step 68 to the participants 5, either directly in FIG. 5 or by way of the check delivery service 14 and the organization 3 in FIG. 4.

Upon receiving the checks 4, the participants 5 may use the checks 4 at face value to buy goods or services (G/S) from any of the participating merchants 6 at step 69. Preferably, the solicitation 60 from the organization 3 includes at least a partial list of the participating merchants 6. Alternatively, the merchants 6 may advertise their acceptance of the special checks 4. The special checks 4, according to the present invention, are bonafide negotiable instruments whose value is backed by deposited funds. They may be used alone or in combination with cash, credit cards, debit cards, personal checks, money orders, travelers' checks, or other forms of recognized tender for retail transactions with the participating merchants 6.

A special feature of the fund raising method 2 of the present invention is the MICR encoding of the checks 4 with the preagreed discount amount 42 prior to being presented for collection or clearance. These actions are symbolized by step 72 in FIG. 3. Larger merchants 6 are provided with equipment (not shown) for such MICR encoding. The intermediary 10 MICR encodes the checks 4 for smaller merchants 6. In either case, the checks 4, with MICR encoded discount amount 42 are deposited in the merchants' banks for clearance back to the organizations' banks 7 through the Federal Reserve System for collection at 74 in FIGS. 4 and 5 (CK FOR CLR). The symbols $-DISCOUNT in FIGS. 4 and 5 represents the MICR encoded amount 42 of the checks 4 which is credited to the merchants 6 through their banks 18.

When the checks 4 have cleared, the accountant receives the remaining portions of the discount difference after the fees of the bank 7 have been paid. The accountant 16 then pays the organization 3 its remaining percentage (shown as Y% in FIGS. 4 and 5) and pays the intermediary 10 its percentage (shown as Z%) of the discount difference. The payouts by the accountant 16 are shown as step 76 in FIG. 3. The accountant 16 may handle the payouts in batches, such as daily or weekly, and may charge the intermediary 10 for its services. The check printer 11 and check delivery service 12 may be paid for their services either by the intermediary 10 or the accountant 16, according to the terms of their contracts.

The non-profit organization 3, thus, raises funds by transactions of its members 5 in making purchases they would otherwise make without direct donations from the members 5. The merchant 6 benefits by increasing its traffic in the goods and/or services it sells and may qualify for tax benefits on its contributions to the organization 3. The organization's bank 7 benefits by holding the deposits of funds which back the checks 4 and by the service fees it charges.

It is to be understood that while certain forms of the present invention have been illustrated and described herein, it is not to be limited to the specific forms or arrangement of parts described and shown.

What is claimed and desired to be secured by Letters Patent is as follows:

1. A method of fund raising for a charitable organization comprising the steps of:
    (a) depositing a monetary fund in a bank by said organization;
    (b) purchasing by a member of said organization a check issued by said organization, said check having a selected face value backed by said fund;
    (c) purchasing merchandise by said member from a retail merchant using said check at said face value;
    (d) transferring a portion of said fund by said bank to said merchant for said face value of said check minus a selected discount; and
    (e) crediting at least a portion of said selected discount to said organization.

2. A method of fund raising for a charitable organization comprising the steps of:
    (a) depositing a monetary fund in a bank by said organization;
    (b) purchasing by a member of said organization a check issued by said organization, said check having a selected face value backed by said fund;
    (c) validating said check by said bank prior to purchase of said check by said member;
    (d) purchasing merchandise by said member from a retail merchant using said check at said face value;
    (e) transferring a portion of said fund by said bank to said merchant for said face value of said check minus a selected discount;
    (e) crediting at least a portion of said selected discount to said organization; and
    (f) crediting an initial portion of said selected discount by said bank to said organization upon validating said check.

3. A method as set forth in claim 2 including the steps of:
    (a) endorsing said check by said member prior to said organization issuing said check; and
    (b) endorsing said check by said member upon said member purchasing merchandise using said check.

4. A method as set forth in claim 2 and including the step of:
  (a) clearing said check from said merchant to said bank by way of a conventional check clearance entity.

5. A method as set forth in claim 2 and including the step of:
  (a) crediting a portion of said selected discount to an intermediary company which negotiates acceptance of said check by said merchant.

6. A method as set forth in claim 2 and including the steps of:
  (a) clearing said check from said merchant to said bank by an intermediary company; and
  (b) crediting a portion of said selected discount to said intermediary company.

7. A method as set forth in claim 2 and including the steps of:
  (a) collecting a monetary sum from said member by said organization, said monetary sum being equal to said face value of said check; and
  (b) depositing said monetary sum in said fund in said bank by said organization to back said check.

8. A method of fund raising for a charitable organization comprising the steps of:
  (a) collecting a monetary sum from a member of said organization;
  (b) depositing said monetary sum in a monetary fund in a bank by said organization;
  (c) validating a check by said bank for a face value equal to said monetary sum;
  (d) issuing said check by said organization to said member;
  (e) purchasing merchandise by said member from a retail merchant using said check at said face value;
  (f) transferring a portion of said fund by said bank to said merchant for said face value of said check minus a selected discount; and
  (e) crediting at least a portion of said selected discount to said organization.

9. A method as set forth in claim 8 and including the steps of:
  (a) endorsing said check by said member prior to said organization issuing said check; and
  (b) endorsing said check by said member upon said member purchasing merchandise using said check.

10. A method as set forth in claim 8 and including the step of:
  (a) clearing said check from said merchant to said bank by way of a conventional check clearance entity.

11. A method as set forth in claim 8 and including the step of:
  (a) crediting an initial portion of said selected discount by said bank to said organization upon validating said check.

12. A method as set forth in claim 8 and including the step of:
  (a) crediting a portion of said selected discount to an intermediary company which negotiates acceptance of said check by said merchant.

13. A method as set forth in claim 8 and including the steps of:
  (a) clearing said check from said merchant to said bank by an intermediary company; and
  (b) crediting a portion of said selected discount to said intermediary company.

14. A method of fund raising for a charitable organization comprising the steps of:
  (a) collecting a monetary sum from a member of said organization;
  (b) depositing said monetary sum in a monetary fund in a bank by said organization;
  (c) validating a check by said bank for a face value equal to said monetary sum;
  (d) issuing said check by said organization to said member;
  (e) endorsing said check by said member prior to said organization issuing said check;
  (f) purchasing merchandise by said member from a retail merchant using said check at said face value;
  (g) endorsing said check by said member upon said member purchasing merchandise using said check;
  (h) transferring a portion of said fund by said bank to said merchant for said face value of said check minus a selected discount;
  (i) crediting a first portion of said selected discount to said organization; and
  (j) crediting a second portion of said selected discount to an intermediary company which negotiates acceptance of said check by said merchant.

15. A method as set forth in claim 14 and including the step of:
  (a) clearing said check from said merchant to said bank by way of a conventional check clearance entity.

16. A method as set forth in claim 14 and including the steps of:
  (a) clearing said check from said merchant to said bank by said intermediary company.

17. A method as set forth in claim 14 and including the step of:
  (a) crediting an initial part of said first portion of said selected discount to said organization by said bank upon validating said check.

18. In a negotiable instrument including a check base with a machine readable bank identification number printed thereon and identifying a bank on which said instrument is drawn, the improvement comprising:
  (a) a payee fill-in line imprinted on said check base to receive a written-in name of a payee of said instrument;
  (b) denomination amount indicia printed on said check base and indicating a face value of said instrument;
  (c) human readable bank indicia printed on said check base identifying said bank on which said instrument is drawn;
  (d) machine readable organization account number indicia printed on said check base and identifying an organization which is to benefit from use of said instrument and which is different from a maker of said instrument;
  (e) a maker presignature line printed on said check base; and
  (f) a maker signature line printed on said check base.

19. A negotiable instrument as set forth in claim 18 and including:
  (a) an organization fill-in line printed on said check base.

20. A negotiable instrument as set forth in claim 18 and including:
  (a) machine readable discount collection amount indicia printed on said check base and indicating a discount collection amount which is collected on said instrument upon clearance thereof, said discount collection amount being less than said face value of said instrument.

21. In a negotiable instrument including a check base with a machine readable bank identification number printed thereon and identifying a bank on which said instrument is drawn, the improvement comprising:
 (a) a payee fill-in line imprinted on said check base to receive a written-in name of a payee of said instrument;
 (b) denomination amount indicia printed on said check base and indicating a face value of said instrument;
 (c) human readable bank indicia printed on said check base identifying said bank on which said instrument is drawn;
 (d) machine readable discount collection amount indicia printed on said check base and indicating a discount collection amount which is collected on said instrument upon clearance thereof, said discount collection amount being less than said face value of said instrument;
 (e) a maker presignature line printed on said check base; and
 (f) a maker signature line printed on said check base.

* * * * *